(12) United States Patent
Abdel Majid et al.

(10) Patent No.: US 10,160,391 B2
(45) Date of Patent: Dec. 25, 2018

(54) VEHICLE FLOOR ASSEMBLY WITH ELECTROMAGNETIC LATCH

(71) Applicants: Ahmad Abdel Majid, Birmingham, MI (US); Maurice J Gisler, Rochester Hills, MI (US)

(72) Inventors: Ahmad Abdel Majid, Birmingham, MI (US); Maurice J Gisler, Rochester Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 3 days.

(21) Appl. No.: 15/418,183

(22) Filed: Jan. 27, 2017

(65) Prior Publication Data

US 2018/0215318 A1    Aug. 2, 2018

(51) Int. Cl.
| | |
|---|---|
| *B60R 7/04* | (2006.01) |
| *E05B 81/08* | (2014.01) |
| *E05C 19/16* | (2006.01) |
| *E05B 83/00* | (2014.01) |
| *B60N 2/90* | (2018.01) |
| *E05B 47/00* | (2006.01) |

(52) U.S. Cl.
CPC .............. *B60R 7/043* (2013.01); *B60N 2/933* (2018.02); *E05B 81/08* (2013.01); *E05B 83/00* (2013.01); *E05C 19/166* (2013.01); *E05B 2047/0068* (2013.01)

(58) Field of Classification Search
CPC ...... B60R 7/043; B60N 2/933; B60N 2/4435; E05B 83/00; E05B 81/08; E05B 2047/0068; E05C 19/166

USPC ..................................................... 296/37.14
See application file for complete search history.

(56) References Cited

U.S. PATENT DOCUMENTS

| | | |
|---|---|---|
| 6,279,982 B1 | 8/2001 | Nishimura et al. |
| 6,869,138 B2 | 3/2005 | Rhodes et al. |
| 6,955,386 B2 | 10/2005 | Rhodes et al. |
| 6,962,384 B2 | 11/2005 | Rhodes et al. |
| 7,066,519 B2 | 6/2006 | Rhodes et al. |
| 7,077,451 B2 | 7/2006 | Rhodes et al. |

(Continued)

FOREIGN PATENT DOCUMENTS

| | | |
|---|---|---|
| DE | 19957380 C1 | 3/2001 |
| FR | 2896459 A1 | 7/2007 |

(Continued)

*Primary Examiner* — Joseph D. Pape
*Assistant Examiner* — Dana D Ivey
(74) *Attorney, Agent, or Firm* — Ralph E Smith

(57) ABSTRACT

A vehicle floor assembly includes a frame, distal and proximal floor panels, distal and proximal hinges, closeout panel, and electromagnet. The frame defines a stowage cavity. The distal panel has an attached end, a free end, and defines a pair of slots open to the free end to receive one of a set of seat risers through the distal panel. The distal hinge couples the attached end to the proximal panel. The proximal hinge couples the proximal panel to the floor frame. The closeout panel includes a pair of closeout members and is pivotable relative to the distal and proximal panels between a first position wherein each closeout member is received in one of the slots, and a second position wherein the closeout members are spaced apart from the slots. Activating the electromagnet magnetically couples the closeout panel to one of the distal or proximal panels for common movement therewith.

20 Claims, 11 Drawing Sheets

(56) References Cited

U.S. PATENT DOCUMENTS

| | | | |
|---|---|---|---|
| 7,377,571 B2 | 5/2008 | Ewers et al. | |
| 7,413,242 B2* | 8/2008 | Rashidy | B60J 7/04 |
| | | | 296/187.12 |
| 7,422,047 B1 | 9/2008 | McDonald | |
| 7,699,388 B2 | 4/2010 | Figueras | |
| 8,172,325 B2 | 5/2012 | Mather | |
| 8,485,583 B2 | 7/2013 | Mather | |
| 8,632,113 B2 | 1/2014 | Mather et al. | |
| 8,702,146 B1 | 4/2014 | Mather | |
| 8,708,393 B2 | 4/2014 | Mather | |
| 8,770,661 B2* | 7/2014 | Kalergis | B60R 7/043 |
| | | | 296/37.15 |
| 9,352,695 B1 | 5/2016 | Karosa | |
| 9,469,349 B1 | 10/2016 | Mather | |
| 2007/0024077 A1 | 2/2007 | McClintock | |
| 2007/0210601 A1 | 9/2007 | Phillips et al. | |
| 2008/0224524 A1 | 9/2008 | Mather et al. | |
| 2013/0014722 A1 | 6/2013 | Mather | |
| 2013/0034195 A1 | 12/2013 | Mather | |
| 2014/0031266 A1 | 10/2014 | Erk | |

FOREIGN PATENT DOCUMENTS

| | | |
|---|---|---|
| FR | 2917680 A1 | 12/2008 |
| WO | 2004043730 A2 | 5/2004 |

* cited by examiner

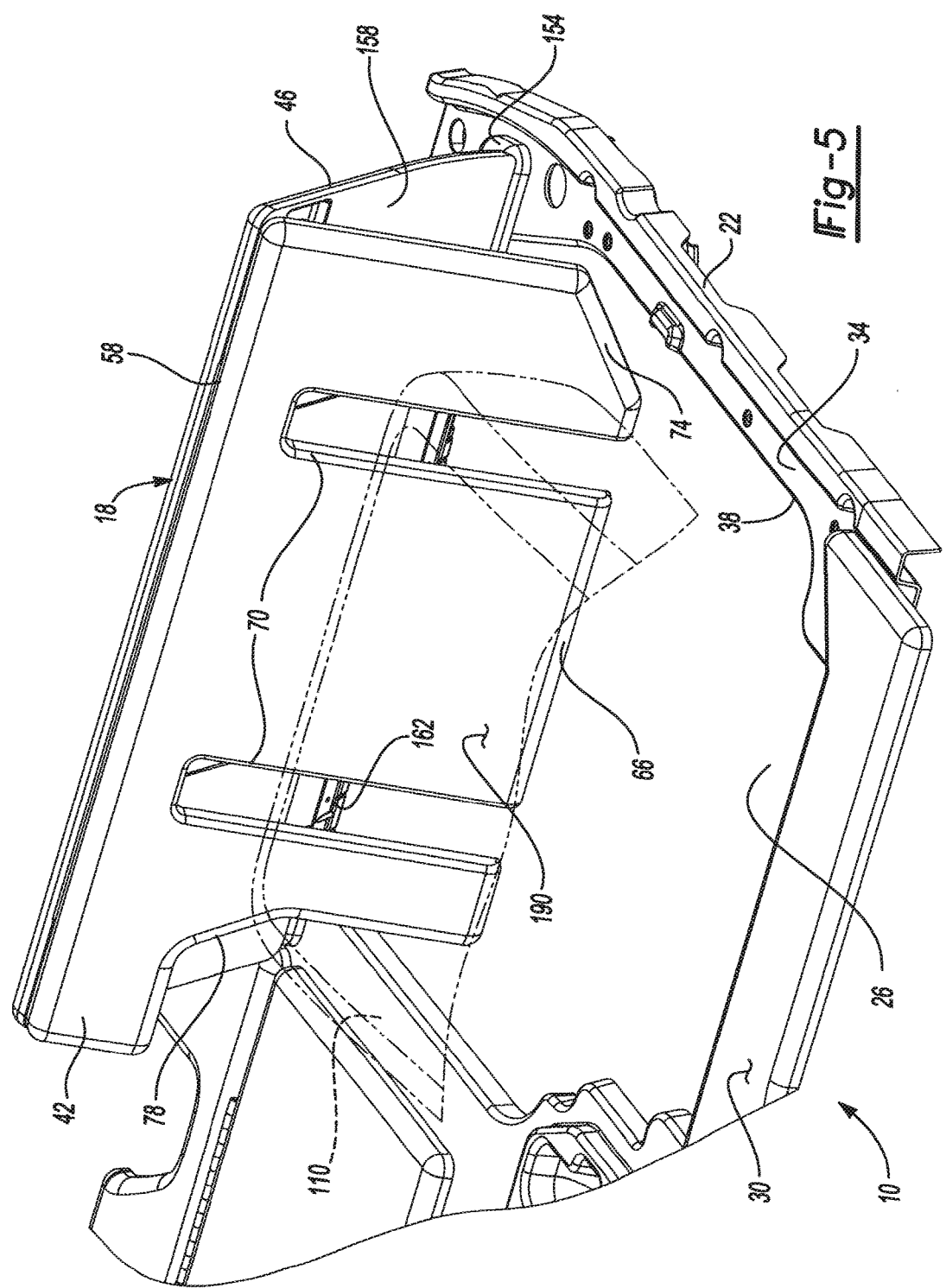

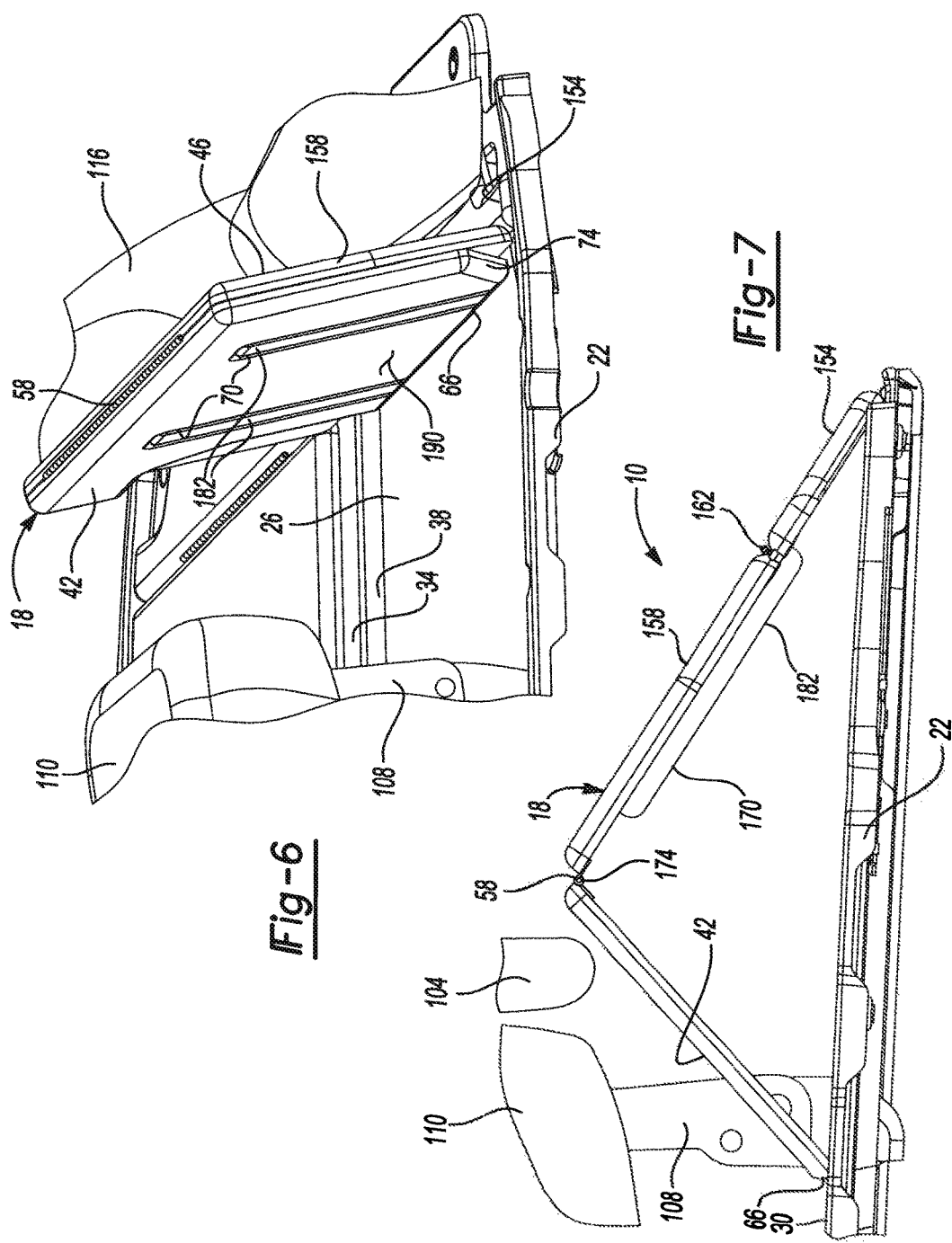

| Element | Scenario | | | | | | | |
|---|---|---|---|---|---|---|---|---|
| | 1 | 2 | 3 | 4 | 5 | 6 | 7 | 8 |
| Seat | Up | Up | Down | Down | Up | Up | Down | Down |
| Load Floor | Down | Up | Down | Up | Down | Up | Down | Up |
| Door | Open | Open | Open | Open | Closed | Closed | Closed | Closed |
| Electromagnet | Off | Off | Off | On | Off | Off | Off | Time |

VEHICLE FLOOR ASSEMBLY WITH ELECTROMAGNETIC LATCH

FIELD

The present disclosure relates to a vehicle floor assembly having an electromagnetic latch.

BACKGROUND

This section provides background information related to the present disclosure and is not necessarily prior art.

In motor vehicles such as vans, mini-vans and sport utility vehicles, it is desirable that passenger seat assemblies be moveable between a number of positions, such as a design position wherein an occupant can sit upon the seat portion of the seat assembly, and an access position wherein the seat assembly is tumbled forward to allow access to cargo or additional seating located behind the seat assembly. It is also desirable to permit the seat assembly to be optionally stowable on-board the vehicle when not in use to provide additional or improved storage capacity for carrying cargo.

One potential solution to this desire for additional storage capacity is a seat assembly that is capable of being stowed within a stowage compartment located within the floor of the vehicle (e.g. below a load floor of the vehicle). Typically, a panel of the load floor is removed to reveal the stowage compartment. Then the seat assembly is folded and moved into the stowage compartment to be covered by the replaced panel of the load floor. Such stowage compartments can also be used to store cargo under the load floor when the seat assembly is not stowed. One drawback of current vehicles with stowable seats is that the load floor typically includes apertures where the seat risers extend through the load floor. Such apertures are typically larger than the risers to account for manufacturing tolerances and to permit the seat assembly to be moved between the design position and the access position. Such apertures in the load floor can permit errant objects to fall under the load floor.

Thus, while vehicle floor assemblies for stowable seat assemblies have generally worked for their intended purpose, there remains a need for continuous improvement in the relevant art.

SUMMARY

In accordance with an aspect of the present disclosure, a vehicle floor assembly includes a floor frame, a distal floor panel, a proximal floor panel, a distal hinge, a proximal hinge, a closeout panel, and an electromagnet. The floor frame defines a stowage cavity. The distal floor panel has an attached end, a free end, and defines a pair of slots. Each slot is open to the free end and configured to receive one of a set of seat risers through the distal floor panel. The distal hinge couples the attached end of the distal floor panel to the proximal floor panel. The proximal hinge couples the proximal floor panel to the floor frame. The closeout panel includes a pair of closeout members. The closeout panel is pivotable relative to the distal and proximal floor panels between a first position wherein each closeout member is received in one of the slots, and a second position wherein the closeout members are spaced apart from the slots. The electromagnet is operable in an activated state wherein the electromagnet magnetically couples the closeout panel to one of the distal floor panel or the proximal floor panel for common movement therewith.

In accordance with another aspect of the present disclosure, the vehicle floor assembly further includes a permanent magnet. The permanent magnet is configured to magnetically couple the closeout panel to the other one of the distal floor panel or the proximal floor panel for common movement therewith when the electromagnet is in a deactivated state.

In accordance with another aspect of the present disclosure, the electromagnet is fixedly coupled to the distal floor panel and the permanent magnet is fixedly coupled to the proximal floor panel.

In accordance with another aspect of the present disclosure, the vehicle floor assembly further includes a seat position sensor, a floor position sensor, and a control module. The seat position sensor is configured to detect a position of a seat relative to the floor frame. The floor position sensor is configured to detect a position of the distal floor panel or the proximal floor panel relative to the floor frame. The control module is in communication with the seat position sensor and the floor position sensor. The control module is configured to activate the electromagnet when the seat position sensor detects the seat in a first predetermined position and the floor position sensor detects the distal floor panel or the proximal floor panel in a second predetermined position.

In accordance with another aspect of the present disclosure, the first predetermined position includes the seat being positioned in the stowage cavity and the second predetermined position includes the distal or proximal floor panel being spaced apart from the floor frame.

In accordance with another aspect of the present disclosure, the vehicle floor assembly further includes a seat frame and the seat position sensor is fixedly coupled to one of the seat frame or one of the seat risers.

In accordance with another aspect of the present disclosure, the floor position sensor is fixedly coupled to the floor frame.

In accordance with another aspect of the present disclosure, the floor position sensor is fixedly coupled to one of the distal floor panel or the proximal floor panel.

In accordance with another aspect of the present disclosure, the vehicle floor assembly further includes a door position sensor configured to detect a position of a vehicle door. The control module is in communication with the door position sensor and is configured to deactivate the electromagnet after a predetermined amount of time when the door position sensor detects the vehicle door in a third predetermined position.

In accordance with another aspect of the present disclosure, the third predetermined position includes the vehicle door being closed.

In accordance with another aspect of the present disclosure, the vehicle floor assembly further includes a seat position sensor, a floor position sensor, and a relay. The seat position sensor is configured to detect when a first condition is met. The first condition includes a seat being positioned in the stowage cavity. The floor position sensor is configured to detect when a second condition is met. The second condition includes the distal floor panel or the proximal floor panel being open relative to the floor frame. The relay is in communication with the seat position sensor and the floor position sensor. The relay is configured to provide electrical power to the electromagnet when the first and second conditions are met and to not provide electrical power to the electromagnet when either one of the first or second conditions is not met.

In accordance with another aspect of the present disclosure, the distal floor panel has a top surface and each of the closeout members has a top surface that is substantially level with the top surface of the distal floor panel when the closeout panel is in the first position.

In accordance with another aspect of the present disclosure, a method of operating a vehicle floor assembly is provided. The vehicle floor assembly includes a floor frame defining a stowage cavity and a load floor pivotably coupled to the floor frame and configured to cover the stowage cavity. The load floor includes a distal floor panel defining a pair of slots and a proximal floor panel pivotably coupled to the floor frame and the distal floor panel. The method includes detecting a position of a seat relative to the stowage cavity, detecting a position of the load floor relative to the stowage cavity, activating an electromagnet when the seat is positioned in the stowage cavity and the load floor is in an open position. Activation of the electromagnet magnetically couples a closeout panel of the load floor to one of the distal floor panel or the proximal floor panel for common movement therewith. The closeout panel includes a pair of closeout members configured to be received in the slots of the distal floor panel.

In accordance with another aspect of the present disclosure, the method further includes detecting a position of a door and deactivating the electromagnet after a predetermined amount of time when the door is in a closed position.

In accordance with another aspect of the present disclosure, the electromagnet is fixedly coupled to the distal floor panel.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

FIG. 5 is a perspective view of a portion of the vehicle of FIG. 1, illustrating the load floor assembly in a third position;

FIG. 6 is a perspective view of a portion of the vehicle of FIG. 1, illustrating the load floor assembly in a fourth position;

FIG. 7 is a side view of a portion of the vehicle of FIG. 1, illustrating the load floor assembly in a fifth position;

DETAILED DESCRIPTION

The present disclosure is directed toward a vehicle load floor assembly that permits a vehicle seat assembly to be stowed within a stowage container or tub that is recessed within the vehicle's floor. According to one aspect of the present disclosure, the load floor assembly includes a pair of slots that are defined by a panel of the load floor assembly and a gap hider device. The slots permit risers of the vehicle seat to extend through the panel of the load floor assembly. The gap hider device includes closeout members that close the slots when the seat assembly is stowed. An electromagnetic latch is provided to position the closeout members relative to the rest of the load floor. The electromagnetic latch is automatically activated based on at least the position of the seat and the load floor such that the user does not need to manually move the closeout members into place.

Figure 1:
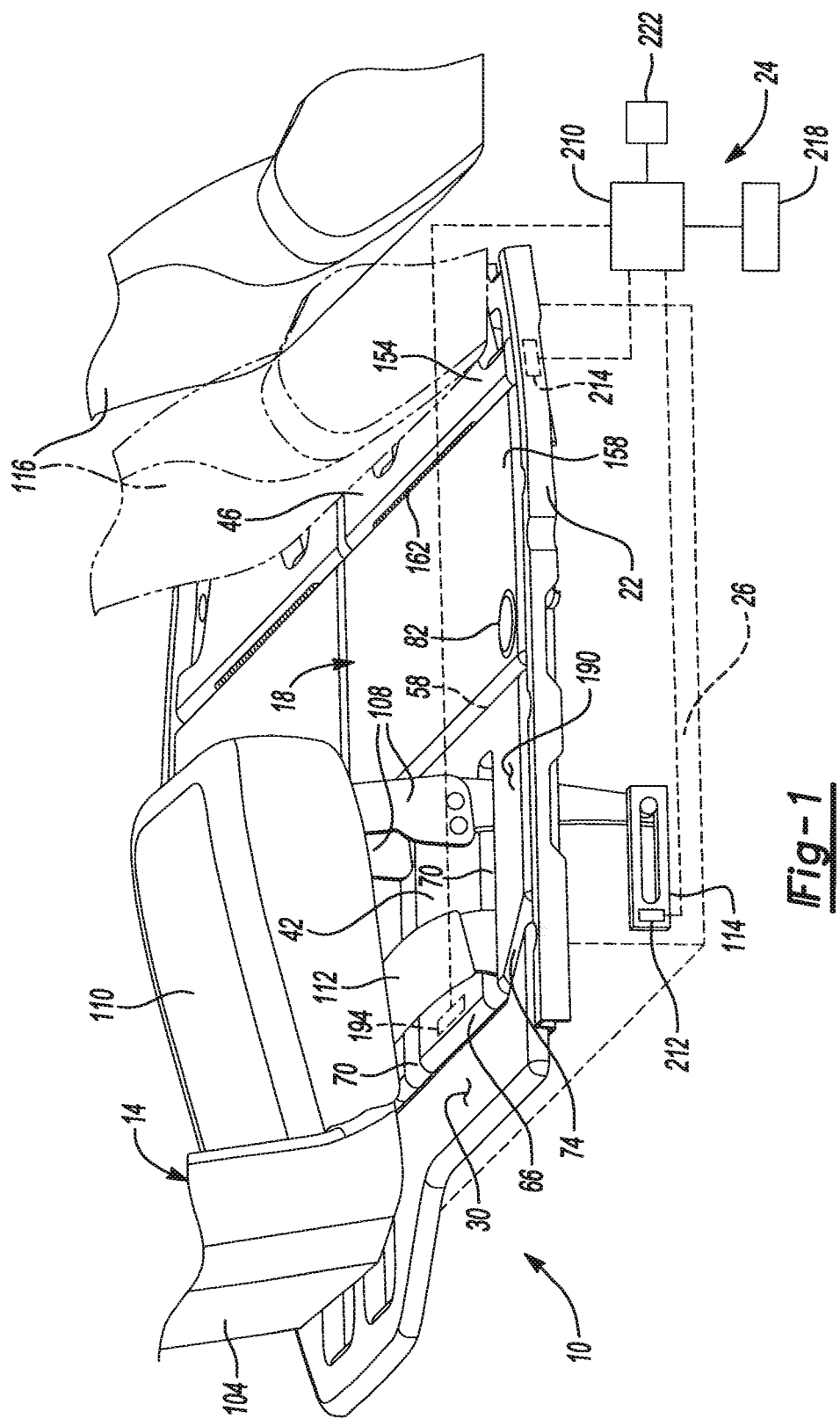
FIG. 1 is a perspective view of a portion of a vehicle in accordance with the present teachings, illustrating a load floor assembly in a first position and a seat assembly in a first deployed position, the load floor assembly having a closeout device and a control system of a first construction.
Figure 2:
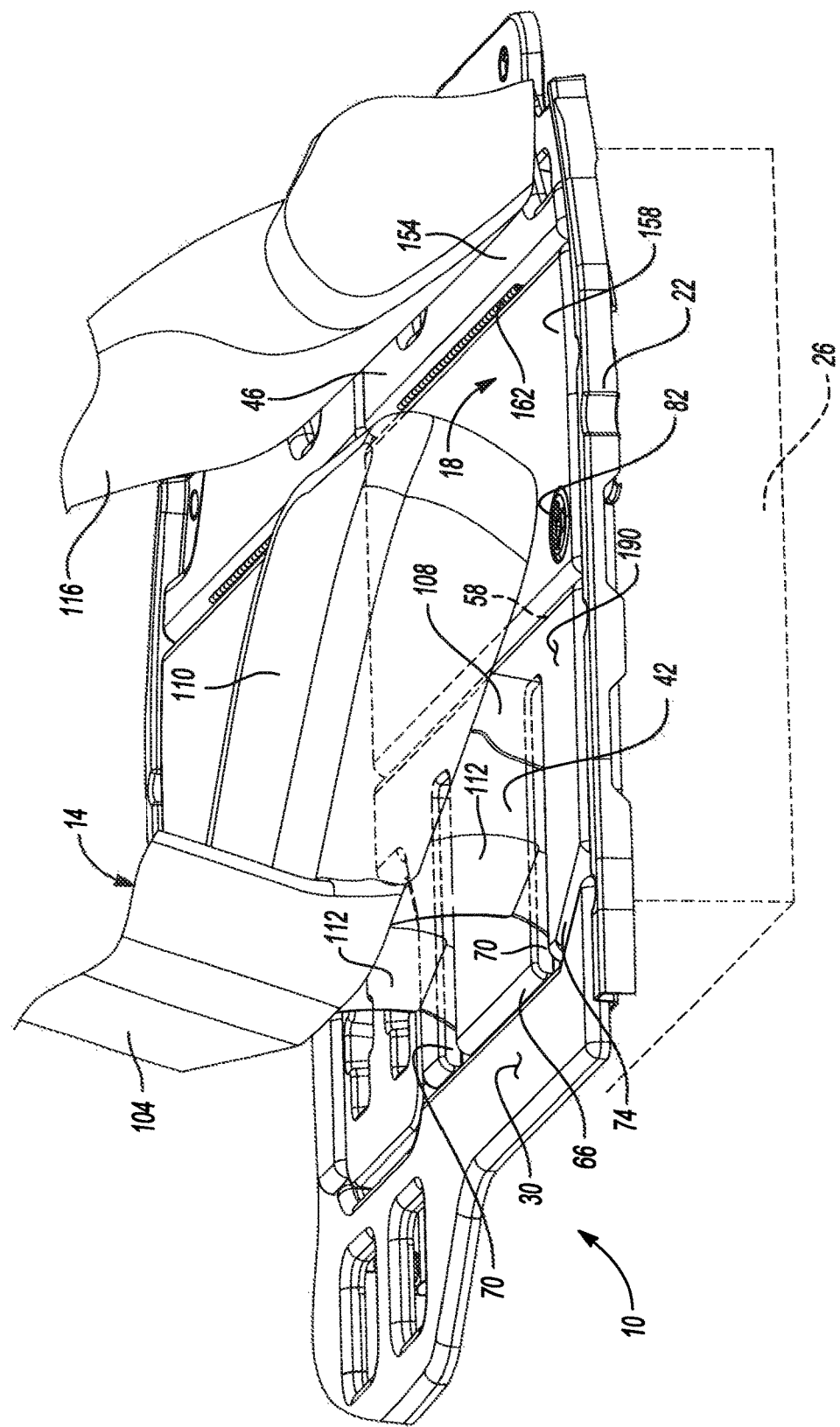
FIG. 2 is a perspective view of a portion of the vehicle of FIG. 1, illustrating the seat assembly in a second deployed position.
Figure 3:
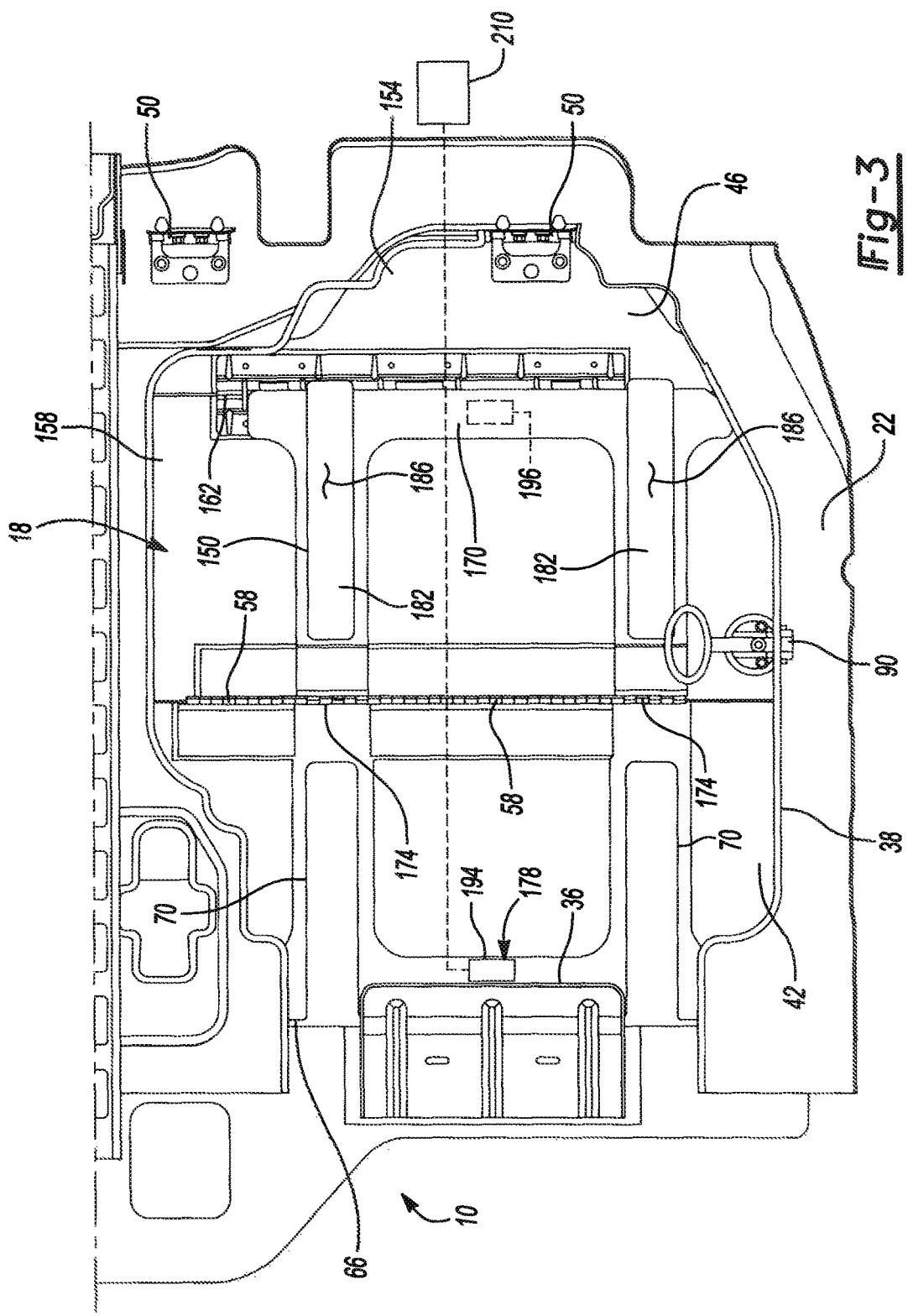
FIG. 3 is a bottom plan view of the load floor assembly of FIG. 1.

With initial reference to FIGS. 1-3, a vehicle floor 10 and a stowable seat assembly 14 of a motor vehicle (not specifically shown) is provided in accordance with the present teachings. The vehicle floor 10 includes a load floor assembly 18, a floor frame 22, a control system 24, and a stowage compartment or tub 26. The floor frame 22 has a top surface 30, a support lip 34 (shown in FIG. 5) that is recessed below the top surface 30, and a support tongue 36 (shown in FIGS. 3 and 4) that is recessed below the top surface 30. The floor frame 22 defines a frame aperture 38. The support lip 34 is disposed about the perimeter of the frame aperture 38, with the support tongue 36 located at one end of the frame aperture 38. The tub 26 is recessed within the vehicle floor 10, below the floor frame 22, and is open to the frame aperture 38 such that the tub 26 is permitted to receive the seat assembly 14 when the seat assembly 14 is moved through the frame aperture 38 to a stowed position (shown in FIG. 9). The load floor assembly 18 is configured to cover the tub 26 to conceal the stowed seat assembly 14 and to provide a generally flat vehicle load floor configuration that is generally level with the surrounding floor frame 22.

The load floor assembly 18 includes a distal floor panel 42 and a proximal floor panel 46. The distal and proximal floor panels 42, 46 are configured to be received in the frame aperture 38 and rest upon the support lip 34 and support tongue 36 to be supported by the support lip 34 and support tongue 36 and cover the tub 26. One end of the proximal floor panel 46 is coupled to the floor frame 22 by a proximal hinge 50 (shown in FIG. 3) to pivot about the axis of the proximal hinge 50. An end of the proximal floor panel 46 that is opposite the proximal hinge 50 is coupled to the distal floor panel 42 by a distal hinge 58 (shown in FIG. 3) to pivot about the axis of the distal hinge 58. The distal floor panel 42 extends from the distal hinge 58 to a free end 66. The distal floor panel 42 defines a pair of slots 70 that extend through the distal floor panel 42 and are generally open at the free end 66. The free end 66 rests upon the support tongue 36.

In the example provided, the free end 66 of the distal floor panel 42 is generally narrower than the end proximate to the distal hinge 58. In the example provided, the distal floor panel 42 includes a chamfer 74 and/or a cut-out 78 (shown in FIG. 5) at the free end 66 proximate to one or both adjacent sides of the distal floor panel 42. In the example provided, the distal floor panel 42 and/or the proximal floor panel 46 includes a pull device 82. The pull device 82 can be any type of device or structure (e.g. a pull ring, or a rigid or flexible strap) such that an operator is able to grab and move the distal and/or proximal floor panels 42, 46. The load floor assembly 18 will be discussed in greater detail below.

The seat assembly 14 generally includes a seat portion 110, a back and head portion 104, a set of front legs or risers 108, a set of rear legs or risers 112, and a frame 114. In the example shown, the seat assembly 14 is a second row of seating for the vehicle, which has a first row of seating (e.g. a first row seat 116) generally in front of the seat assembly 14, though other configurations can be used. FIG. 1 illustrates the seat assembly 14 in a first deployed position or a design position and the distal and proximal floor panels 42, 46 of the load floor assembly 18 in the first position.

The front and rear risers 108, 112 are generally coupled to the frame 114 which is fixedly mounted to the floor 10 of the vehicle within the tub 26. The front and rear risers 108, 112 are configured to support the seat portion 110 above the vehicle floor 10 when the seat assembly 14 is deployed and to pivot and/or slide along the frame 114 to permit the seat portion 110 to be moved into the stowed position within the tub 26. While illustrated with the seat assembly 14 facing longitudinally toward the first row of seating 116, it is understood that the seat assembly 14 can be designed to face in other directions, such as laterally within the vehicle or away from the first row of seating 116 for example. The front risers 108 and rear risers 112 are received in the slots 70 to extend through the distal floor panel 42 when the seat assembly 14 is deployed. It is understood that the seat assembly 14 can be constructed or oriented in other manners such that only the front risers 108 or only the rear risers 112 are received in the slots 70.

The seat portion 110 is configured to generally support a passenger (not shown) in a conventional manner above the vehicle floor 10 when the seat assembly 14 is in the design position. The back and head portion 104 is configured to generally provide support for the passenger's back and head when the passenger is seated on the seat portion 110.

In the example provided, the seat assembly 14 is moveable between the design position (shown in FIG. 1) and a second deployed position or access position (shown in FIG. 2). When the seat assembly 14 is in the access position, a passageway is provided to an area rearward of the seat assembly 14 for access to cargo and/or ingress/egress to a third row of seating (not shown) behind the seat assembly 14. In addition to being stowable and moveable between the design and access positions, the seat assembly 14 of the present teachings also includes fore-aft adjustment capabilities. It is appreciated that other seat assemblies of the vehicle, in other locations besides a second row, can be constructed in accordance with the present teachings.

With additional reference to FIG. 3, a bottom plan view of a portion of the load floor assembly 18 is illustrated with the distal and proximal floor panels 42, 46 in the first position. In addition to the distal and proximal floor panels 42, 46, the load floor assembly 18 also includes a closeout device 150. The proximal floor panel 46 may optionally also be subdivided into a proximal panel member 154 and an intermediate panel member 158. In the example provided, the proximal panel member 154 is coupled to the floor frame 22 by the proximal hinge 50, and to the intermediate panel member 158 by an access hinge 162 (shown in FIG. 1) to pivot about the axis of the access hinge 162. The access hinge 162 is configured to be selectively locked, such as to prevent the proximal panel member 154 from pivoting relative to the intermediate panel member 158 about the access hinge 162. In this example, the intermediate panel member 158 is coupled to the distal floor panel 42 by the distal hinge 58 opposite the access hinge 162. In the example provided, the distal floor panel 42 extends from the distal hinge 58 to the free end 66 a length that is greater than the length of the intermediate panel member 158 (i.e., between the distal and access hinges 58, 162).

The closeout device 150 includes a closeout panel 170, a fourth hinge 174, and a latching mechanism 178. The fourth hinge 174 couples the closeout panel 170 to the distal and/or proximal floor panel 42, 46 for rotation relative to the distal and proximal floor panels 42, 46 about the fourth hinge 174. In the example provided, the fourth hinge 174 is positioned such that the closeout panel 170 pivots about the same axis as the distal hinge 58 (i.e., the fourth hinge 174 is coaxial with the distal hinge 58).

The closeout panel 170 includes a pair of closeout members 182 also known as "twinkles". The closeout members 182 are fixedly coupled together such that the closeout members 182 pivot about the fourth hinge 174 together between a first closeout position (shown in FIGS. 3-5) and a second closeout position (shown in FIGS. 10 and 11). Each closeout member 182 is a generally elongated body that has a shape similar to the slots 70 of the distal floor panel 42. Each closeout member 182 is configured to be received in a corresponding one of the slots 70 to fill the corresponding slot 70 when in the second closeout position. In the example provided the closeout members 182 are configured such that a top surface 186 of each closeout member 182 is generally level with a top surface 190 (shown in FIGS. 10 and 11) of the distal floor panel 42 when in the second closeout position.

Figure 4:
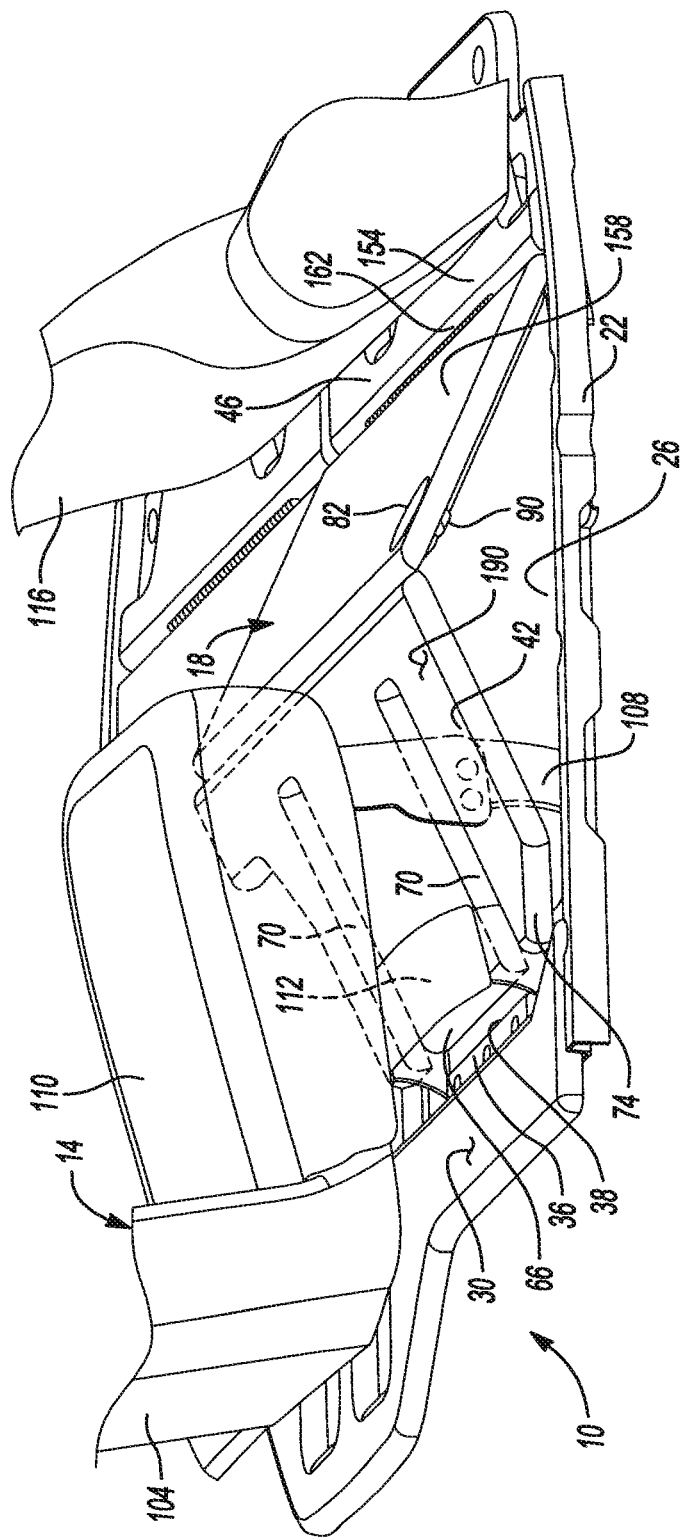
FIG. 4 is a perspective view of a portion of the vehicle of FIG. 1, illustrating the load floor assembly in a second position.
Figure 8:
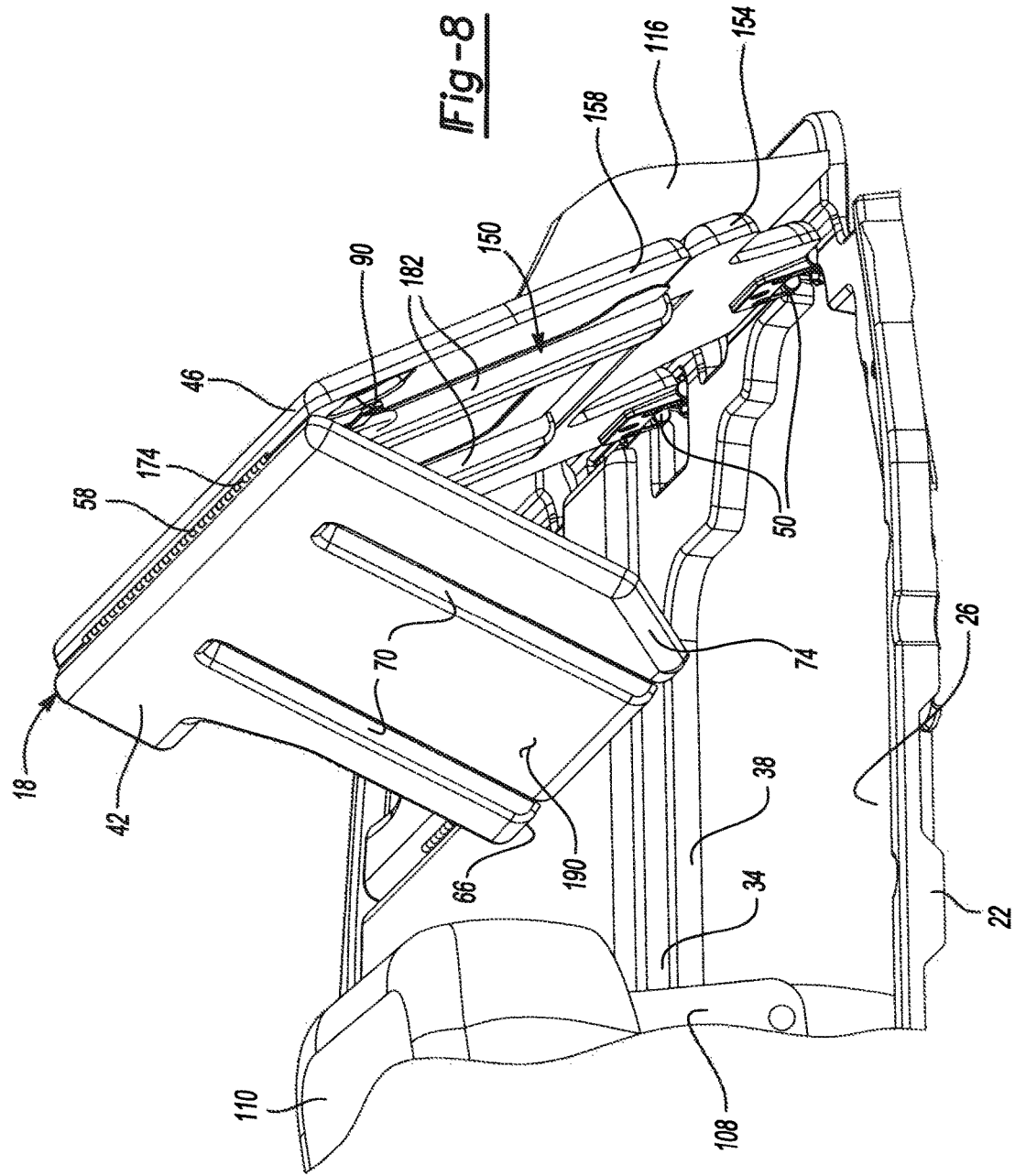
FIG. 8 is a perspective view of a portion of the vehicle of FIG. 1, illustrating the load floor assembly in a sixth position.

The latching mechanism 178 generally latches or attaches the closeout panel 170 to the distal floor panel 42 for common movement therewith when in the second closeout position (shown in FIGS. 10 and 11), and latches the closeout panel 170 to the proximal floor panel 46 for common movement therewith when in the first closeout position (shown in FIGS. 3-5). In the example provided, the latching mechanism 178 includes a distal magnet 194, and a proximal magnet 196. The distal magnet 194 is fixedly coupled to the distal floor panel 42. The proximal magnet 196 is fixedly coupled to the proximal floor panel 46. In the example provided, the distal magnet 194 is an electromagnet and is referred to as electromagnet 194 below, while the proximal magnet 196 is a permanent magnet. A portion of the closeout panel 170 is configured to be magnetically attracted to the proximal magnet 196 and to the electromagnet 194 when the electromagnet 194 is activated. In the example provided, magnetic force of the activated electromagnet 194 on the portion of the closeout panel 170 is configured to overcome the magnetic force of the proximal magnet 196 on the portion of the closeout panel 170. In the example provided, the portion of the closeout panel 170 is formed of a ferromagnetic material (e.g. steel). In an alternative construction, not specifically shown, the portion of the closeout panel 170 includes a permanent magnet.

In an alternative construction, not specifically shown, the distal magnet 194 is a permanent magnet and the proximal magnet 196 is an electromagnet connected to a control module 210 (e.g., a controller, processing unit, the vehicle's computer, or control circuitry). In another alternative construction, not specifically shown, both the distal and proximal magnets 194, 196 are electromagnets connected to the control module 210 and a latch (not specifically shown) is incorporated on the proximal floor panel 46 to hold the closeout panel 170 in the first closeout position (FIGS. 3-5) when the proximal magnet 196 is not activated.

The control system 24 includes the control module 210, a seat position sensor 212, a floor position sensor 214, and a power supply (e.g., the vehicle's battery 218). In the example provided, the control system also includes an optional door position sensor 222. The seat position sensor 212 is any suitable type of sensor (e.g., microswitch, contact switch, Hall Effect sensor, proximity sensor) configured to output a signal indicative of whether the seat assembly 14 is in the deployed position or the stowed position. In the example provided, the seat position sensor 212 is fixedly attached to the frame 114, though other configurations are possible. The floor position sensor 214 is any suitable type of sensor (e.g., microswitch, contact switch, Hall Effect sensor, proximity sensor) configured to output a signal indicative of a position of the load floor assembly 18, as discussed below. In the example provided, the floor position sensor 214 is fixedly attached to the floor frame 22, though other configurations are possible. In an alternative configuration, the floor position sensor 214 is fixedly attached to the distal or proximal floor panel 42, 46. The door position sensor 222 is configured to output a signal indicative of whether a door, or doors (not specifically shown) of the vehicle are open or closed.

With additional reference to FIGS. 1, and 4-11, operation of the load floor assembly 18 will be described in greater detail. As described above, FIG. 1 illustrates the seat assembly 14 in the design position and the load floor assembly 18 in a first position. In this position, the seat assembly 14 is free to be adjusted fore-aft or moved to the access position (FIG. 2). The first row seat 116 is generally free to be moved fore-aft between a forward position (shown in solid lines in FIG. 1) wherein the first row seat 116 is completely forward of the proximal floor panel 46, and a rearward position (shown in dashed lines in FIG. 1) wherein the first row seat 116 is at least partially over the proximal floor panel 46 (e.g. over the proximal panel member 154).

With specific reference to FIGS. 4-6, the tub 26 is accessible to store cargo without the need to articulate the entire load floor assembly 18. To do so, an operator moves the distal floor panel 42 and the intermediate panel member 158 (e.g. by unlocking the access hinge 162 and operating the pull device(s) 82) while the proximal panel member 154 remains stationary relative to the floor frame 22.

In moving the load floor assembly 18 from the first position (shown in FIG. 1) to a second position (shown in FIG. 4), the intermediate panel member 158 pivots upwards about the access hinge 162 and the distal floor panel 42 pivots downward about the distal hinge 58 to avoid the seat assembly 14. In moving the load floor assembly 18 from the second position (shown in FIG. 4) to a third position (shown in FIG. 5), the distal floor panel 42 is pulled away from the seat assembly 14 and the risers 108, 112 have exited the slots 70 through the open free end 66. As shown in FIG. 5, since the distal floor panel 42 in the example provided is longer than the intermediate panel member 158, the narrower free end 66 of the distal floor panel 42 is received partially through the frame aperture 38 when the distal floor panel 42 is pivoted from the third position (shown in FIG. 5) to a fourth position (shown in FIG. 6).

FIG. 6, illustrates the load floor assembly 18 in the fourth position, in which the proximal panel member 154 is generally flush with the floor frame 22, the intermediate panel member 158 is positioned at an angle relative to the proximal panel member 154, and the distal floor panel 42 is generally folded against the intermediate panel member 158 such that their respective bottoms oppose one another and the closeout members 182 are received in the slots 70. Reversing these operations returns the load floor assembly 18 to the first position (shown in FIG. 1). In this way, the load floor assembly 18 of the present disclosure allows for access to the cargo in the tub 26 when the first row seat 116 is in the rearward position (i.e., covering a portion of the proximal panel member 154 and the proximal hinge 50) and without the need to articulate the entire load floor assembly 18.

With specific reference to FIGS. 7-11, the load floor assembly 18 is articulatable to permit the seat assembly 14 to be stowed in the tub 26 with the closeout members 182 filling the slots 70 and the load floor assembly 18 covering the stowed seat assembly 14. In moving the load floor assembly 18 from the first position (shown in FIG. 1) to a fifth position (shown in FIG. 7), the floor position sensor 214 sends a signal to the control module 210 indicative of the load floor assembly 18 being opened. In moving the load floor assembly 18 from the first position (shown in FIG. 1) to a fifth position (shown in FIG. 7), the first row seat 116 is in the forward position and the operator moves the distal floor panel 42 with the entire proximal floor panel 46 (e.g., by locking the access hinge 162 and operating the pull device(s) 82) such that the proximal floor panel 46 pivots upward about the proximal hinge 50 and the distal floor panel 42 pivots downward about the distal hinge 58 to avoid the seat assembly 14. The distal and proximal floor panels 42, 46 are then moved to the fifth position (shown in FIG. 7) with the back and head portion 104 of the seat assembly 14 folded over the seat portion 110, while still avoiding the seat assembly 14. In moving the load floor assembly 18 from the fifth position (shown in FIG. 7) to a sixth position (shown in FIG. 8), the distal floor panel 42 is pulled away from the seat assembly 14 and the risers 108, 112 have exited the slots 70 through the open free end 66.

Figure 9:
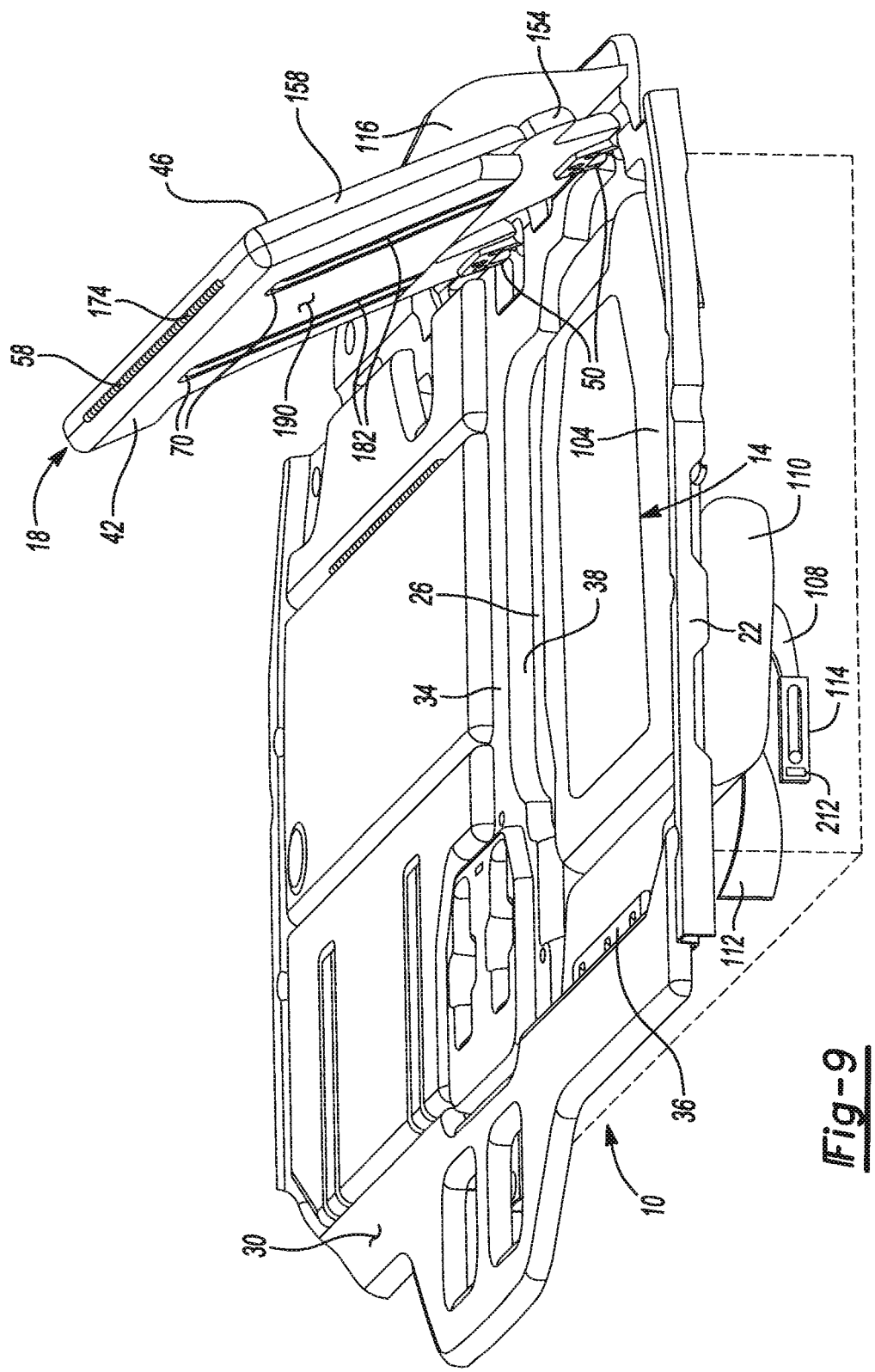
FIG. 9 is a perspective view of a portion of the vehicle of FIG. 1, illustrating the load floor assembly in a seventh position and the seat assembly in a stowed position.

The load floor assembly 18 is movable from the sixth position (shown in FIG. 8) to a seventh position (shown in FIG. 9). In the seventh position (shown in FIG. 9), the distal floor panel 42 is generally folded against the proximal floor panel 46 such that their respective bottoms oppose one another and the closeout members 182 are received in the slots 70. In this position, the back and head portion 104 of the seat assembly 14 are folded over the seat portion 110 and the seat assembly 14 is lowered into the tub 26 to be in the stowed position as shown in FIG. 9.

Figure 10:
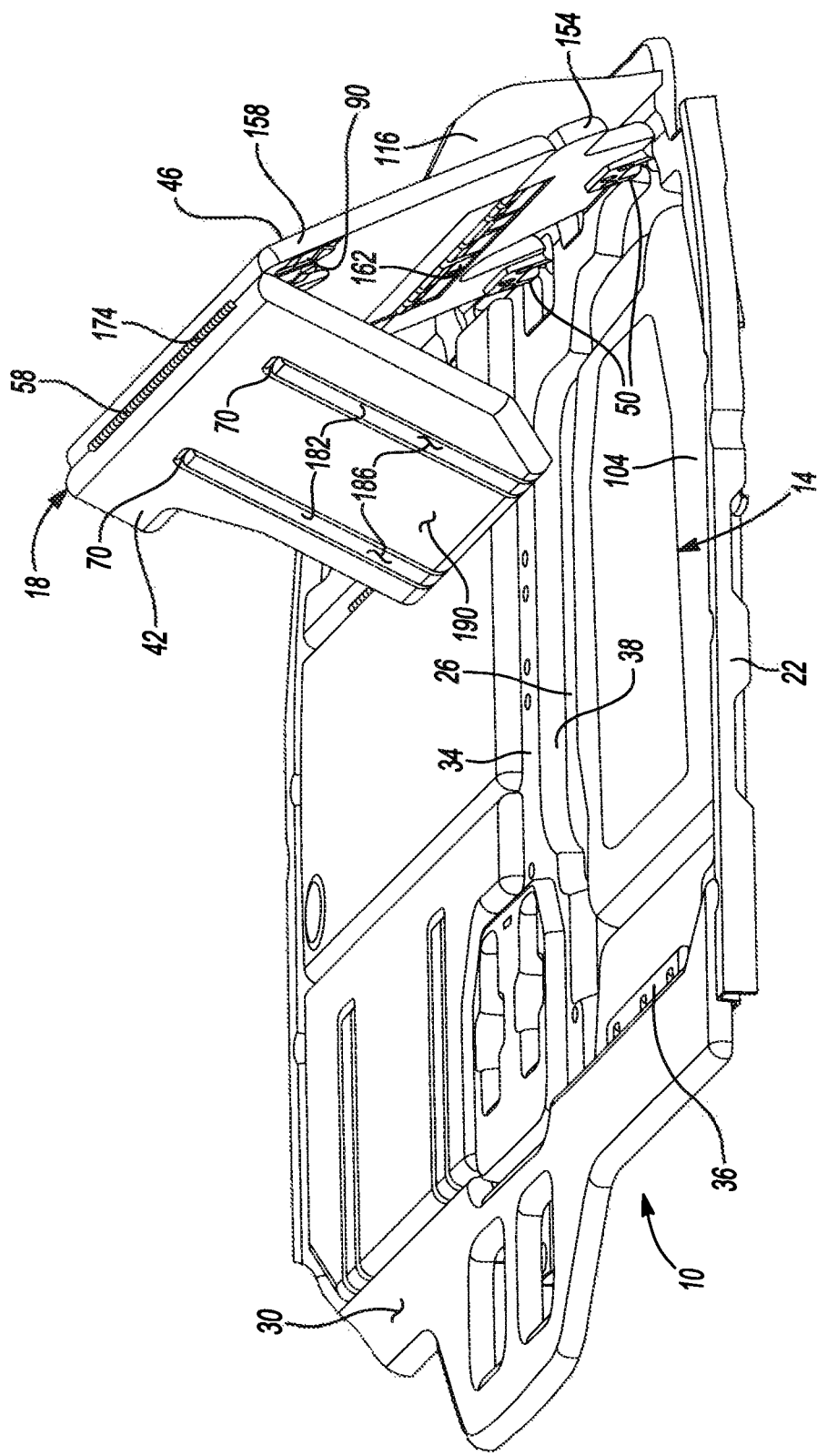
FIG. 10 is a perspective view of a portion of the vehicle of FIG. 1, illustrating the load floor assembly in an eighth position.

With the seat assembly 14 stowed, the seat position sensor 212 sends a signal to the control module 210 indicative of the seat assembly 14 being stowed. With the seat assembly 14 stowed, the load floor assembly 18 is movable from the seventh position (shown in FIG. 9) to an eighth position (shown in FIG. 10). In the eighth position (shown in FIG. 10), or a suitable similar position, the control module 210 receives signals indicative of the load floor assembly 18 being open and the seat assembly 14 being stowed, and as a result, the control module 210 activates the electromagnet 194. The magnetic field of the electromagnet 194 is configured to overcome the magnetic attraction between the closeout panel 170 and the proximal magnet 196 to pivot the closeout panel 170 from the first closeout position to the second closeout position and hold the closeout panel 170 to the distal floor panel 42, as shown in FIG. 10.

Figure 11:
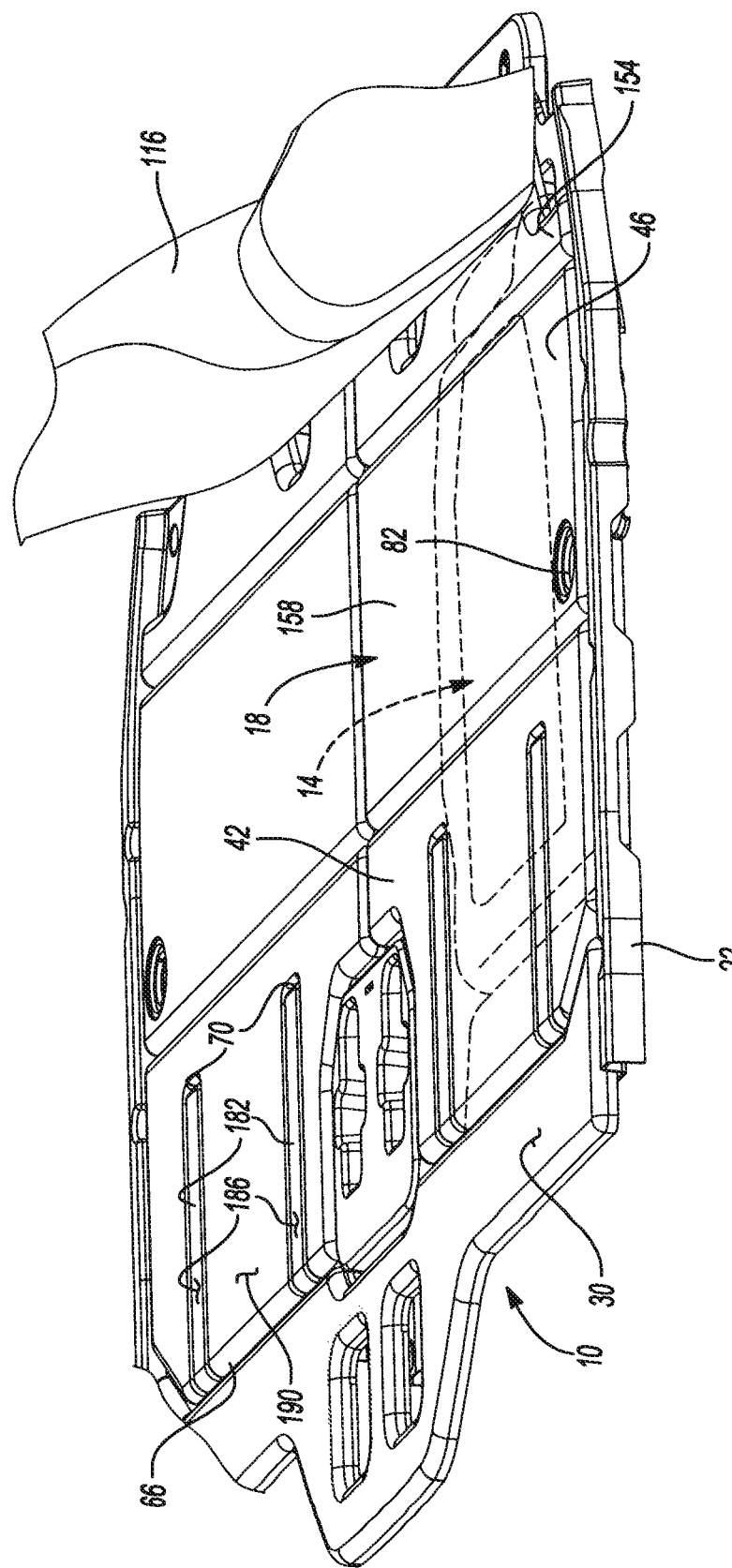
FIG. 11 is a perspective view similar to FIG. 9, illustrating the load floor assembly in a ninth position.

With the closeout panel 170 magnetically held by the electromagnet 194 for motion with the distal floor panel 42, the load floor assembly 18 is movable from the eighth position (shown in FIG. 10) to a ninth position (shown in FIG. 11). The ninth position is generally the same as the first position (shown in FIG. 1), but with the closeout members 182 received in the slots 70. Once the load floor assembly 18 is in the ninth position (shown in FIG. 11), the control module receives a signal from the floor position sensor 214 indicative of the load floor assembly 18 being closed, and the control module deactivates the electromagnet 194. In this position, the closeout panel 170 is held in place by resting on the support tongue 36 (shown in FIG. 3) of the floor frame 22.

Reversing these operations re-deploys the seat assembly 14. When reversing the operations, the load floor assembly 18 is lifted up, causing the floor position sensor 214 to send a signal indicative of the load floor assembly 18 being open. Since the seat assembly 14 is still stowed, and the load floor assembly 18 is opened, the control module 210 activates the electromagnet 194 to magnetically latch the closeout panel 170 to the distal floor panel 42 for movement therewith. When the seat assembly 14 is removed from the tub 26, the control module 210 then deactivates the electromagnet 194 and the proximal magnet 196 magnetically latches the closeout panel 170 to the proximal floor panel 46.

When the optional door position sensor 222 is included in the control system 24, the control module also considers the position of the vehicle's door (not specifically shown) when deciding whether or not to maintain activation of the electromagnet 194. In the example provided, the control module 210 will maintain activation of the electromagnet 194 when the seat assembly 14 is stowed, the load floor assembly 18 is open, and the door is open. If the seat assembly 14 is stowed, the load floor assembly 18 is open, and the door is closed, the control module 210 will deactivate the electromagnet 194 after a predetermined amount of time. In this way, the electromagnet 194 does not drain the vehicle's battery 218 if an operator leaves the vehicle with the seat assembly 14 in the stowed position and the load floor assembly open. Additionally, or alternatively, the control module 210 can deactivate the electromagnet 194 if the operator locks the doors, such as using a key fob, or if the control module otherwise determines that the operator has left the vicinity of the vehicle.

Figures 12, 13:
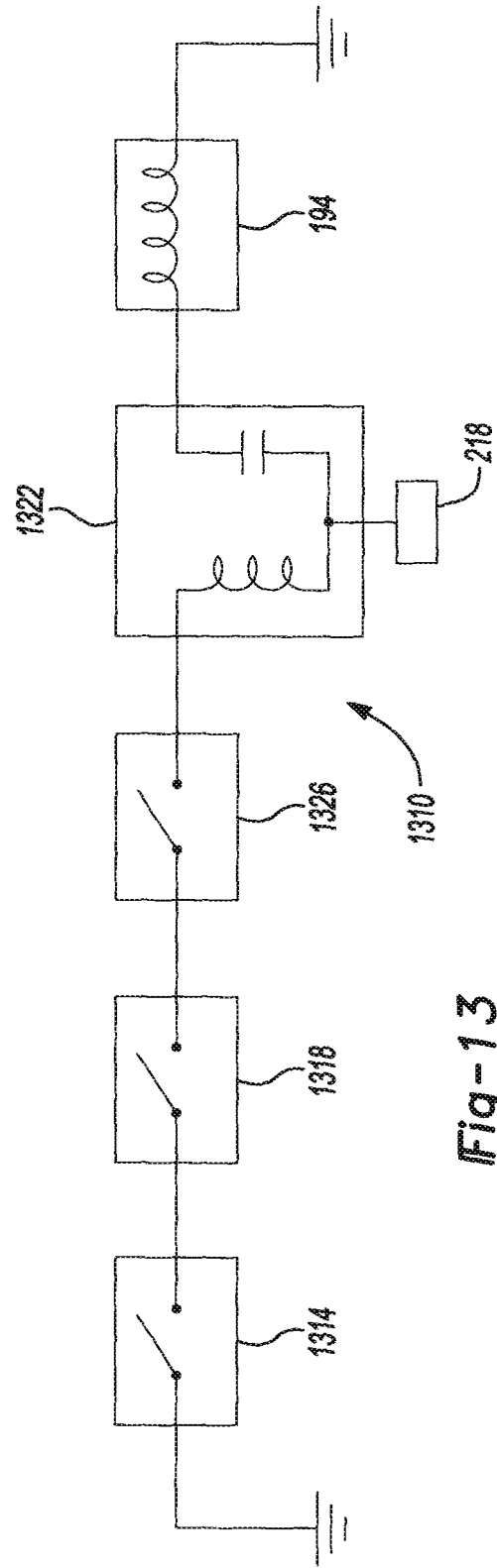
FIG. 12 is a chart indicating states of elements of the control system of FIGS. 1-11 in different operational scenarios.
FIG. 13 is a schematic electrical diagram of a second construction of a control system of the load floor assembly of FIGS. 1-11.

With additional reference to FIG. 12, a chart illustrates some possible scenarios of the control module activating the electromagnet 194 based on the states of elements of the vehicle (e.g., the seat assembly 14, the load floor assembly 18, and the door position sensor 222). In scenario 1, the seat assembly 14 is deployed (e.g., up), the load floor assembly 18 is closed (e.g., down), and the door is open. In scenario 1, the electromagnet 194 is not activated. In scenario 2, the seat assembly 14 is deployed (e.g., up), the load floor assembly 18 is open (e.g., up), and the door is open. In scenario 2, the electromagnet 194 is not activated. In scenario 3, the seat assembly 14 is stowed (e.g., down), the load floor assembly 18 is closed (e.g., down), and the door is open. In scenario 3, the electromagnet 194 is not activated. In scenario 4, the seat assembly 14 is stowed (e.g., down), the load floor assembly 18 is open (e.g., up), and the door is open. In scenario 4, the electromagnet 194 is activated.

In scenario 5, the seat assembly 14 is deployed (e.g., up), the load floor assembly 18 is closed (e.g., down), and the door is closed. In scenario 5, the electromagnet 194 is not activated. In scenario 6, the seat assembly 14 is deployed (e.g., up), the load floor assembly 18 is open (e.g., up), and the door is closed. In scenario 6, the electromagnet 194 is not activated. In scenario 7, the seat assembly 14 is stowed (e.g., down), the load floor assembly 18 is closed (e.g., down), and the door is closed. In scenario 7, the electromagnet 194 is not activated. In scenario 8, the seat assembly 14 is stowed (e.g., down), the load floor assembly 18 is open (e.g., up), and the door is closed. In scenario 8, if the electromagnet 194 is activated, the control module deactivates the electromagnet 194 after a predetermined amount of time.

With additional reference to FIG. 13, a second construction of the control system 24 is schematically illustrated and indicated with reference numeral 1310. The control system 1310 is similar to the control system 24, except as otherwise shown and described herein. The control system 1310 includes a seat position sensor 1314, a floor position sensor 1318, a relay 1322, and the electromagnet 194. In the example provided, the control system 1310 also includes an optional door position sensor 1326. In an alternative construction, not specifically shown, the door position sensor 1326 is omitted. The seat position sensor 1314, floor position sensor 1318, door position sensor 1326, and electromagnet 194 are similar to the seat position sensor 212, floor position sensor 214, door position sensor 222, and electromagnet 194 described above with reference to FIGS. 1-11, except as otherwise shown or described herein.

A power supply (e.g., the vehicle battery 218) is electrically connected to the relay 1322. The seat position sensor 1314, the floor position sensor 1318, and the door position sensor 1326 are electrically in series and electrically connected to the detecting side of the relay 1322 and to electrical ground, though other configurations are possible. The electromagnet 194 is electrically connected to the output side of the relay 1322 and to electrical ground.

In the example provided, the seat position sensor 1314 is a switch configured to be in the closed state (e.g., permit electrical communication across the switch) when the seat assembly 14 is in the stowed position. In the example provided, the floor position sensor 1318 is a switch configured to be in the closed state when the load floor assembly 18 is opened. In the example provided, the door position sensor 1326 is a switch configured to be in the closed state when the vehicle door is open. The relay 1322 is configured to detect when all the sensors (e.g., the seat position sensor 1314, the floor position sensor 1318, and the door position sensor 1326) are in the closed state and to provide electrical power to the electromagnet 194 when all of the sensors are in the closed state. The relay 1322 is configured to prevent electrical power from flowing to the electromagnet 194 when one of the sensors is in the open state.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A vehicle floor assembly comprising:
  a floor frame defining a stowage cavity;
  a distal floor panel having an attached end, a free end, and defining a pair of slots, each slot being open to the free end and configured to receive one of a set of seat risers through the distal floor panel;
  a proximal floor panel;

a distal hinge coupling the attached end of the distal floor panel to the proximal floor panel;
a proximal hinge coupling the proximal floor panel to the floor frame;
a closeout panel including a pair of closeout members, the closeout panel being pivotable relative to the distal and proximal floor panels between a first position wherein each closeout member is received in one of the slots, and a second position wherein the closeout members are spaced apart from the slots; and
an electromagnet operable in an activated state wherein the electromagnet magnetically couples the closeout panel to one of the distal floor panel or the proximal floor panel for common movement therewith.

2. The vehicle floor assembly of claim 1, further comprising a permanent magnet, the permanent magnet being configured to magnetically couple the closeout panel to the other one of the distal floor panel or the proximal floor panel for common movement therewith when the electromagnet is in a deactivated state.

3. The vehicle floor assembly of claim 2, wherein the electromagnet is fixedly coupled to the distal floor panel and the permanent magnet is fixedly coupled to the proximal floor panel.

4. The vehicle floor assembly of claim 1, further comprising:
a seat position sensor configured to detect a position of a seat relative to the floor frame;
a floor position sensor configured to detect a position of the distal floor panel or the proximal floor panel relative to the floor frame; and
a control module in communication with the seat position sensor and the floor position sensor, the control module being configured to activate the electromagnet when the seat position sensor detects the seat in a first predetermined position and the floor position sensor detects the distal floor panel or the proximal floor panel in a second predetermined position.

5. The vehicle floor assembly of claim 4, wherein the first predetermined position includes the seat being positioned in the stowage cavity and the second predetermined position includes the distal or proximal floor panel being spaced apart from the floor frame.

6. The vehicle floor assembly of claim 4, further comprising a seat frame, wherein the seat position sensor is fixedly coupled to one of the seat frame or one of the seat risers.

7. The vehicle floor assembly of claim 4, wherein the floor position sensor is fixedly coupled to the floor frame.

8. The vehicle floor assembly of claim 4, wherein the floor position sensor is fixedly coupled to one of the distal floor panel or the proximal floor panel.

9. The vehicle floor assembly of claim 4, further comprising a door position sensor configured to detect a position of a vehicle door, wherein the control module is in communication with the door position sensor and is configured to deactivate the electromagnet after a predetermined amount of time when the door position sensor detects the vehicle door in a third predetermined position.

10. The vehicle floor assembly of claim 9, wherein the third predetermined position includes the vehicle door being closed.

11. The vehicle floor assembly of claim 1, wherein the distal floor panel has a top surface and each of the closeout members has a top surface that is substantially level with the top surface of the distal floor panel when the closeout panel is in the first position.

12. The vehicle floor assembly of claim 1, further comprising:
a seat position sensor configured to detect when a first condition is met, the first condition including a seat being positioned in the stowage cavity;
a floor position sensor configured to detect when a second condition is met, the second condition including the distal floor panel or the proximal floor panel being open relative to the floor frame; and
a relay in communication with the seat position sensor and the floor position sensor and configured to provide electrical power to the electromagnet when the first and second conditions are met and to not provide electrical power to the electromagnet when either one of the first or second conditions is not met.

13. A method of operating a vehicle floor assembly that includes a floor frame defining a stowage cavity, a load floor pivotably coupled to the floor frame and configured to cover the stowage cavity, the load floor including a distal floor panel defining a pair of slots, and a proximal floor panel pivotably coupled to the floor frame and the distal floor panel, the method comprising:
detecting a position of a seat relative to the stowage cavity;
detecting a position of the load floor relative to the stowage cavity; and
activating an electromagnet when the seat is positioned in the stowage cavity and the load floor is in an open position, wherein activation of the electromagnet magnetically couples a closeout panel of the load floor to one of the distal floor panel or the proximal floor panel for common movement therewith, the closeout panel including a pair of closeout members configured to be received in the slots of the distal floor panel.

14. The method of claim 13, further comprising:
detecting a position of a vehicle door; and
deactivating the electromagnet after a predetermined amount of time when the vehicle door is in a closed position.

15. The method of claim 13, wherein the electromagnet is fixedly coupled to the distal floor panel.

16. A vehicle floor assembly comprising:
a floor frame having a top surface and a stowage cavity;
a distal floor panel having an attached end, a free end, and defining a pair of slots, each slot being open to the free end and configured to receive one of a set of seat risers through the distal floor panel;
a proximal floor panel;
a distal hinge coupling the attached end of the distal floor panel to the proximal floor panel and a proximal hinge coupling the proximal floor panel to the floor frame such that the distal and proximal floor panels are pivotable between a flat position and a folded position, the distal and proximal floor panels arranged parallel to the top surface of the floor frame in the flat position;
a closeout panel including a pair of closeout members, the closeout panel being pivotable relative to the distal and proximal floor panels between a first position wherein each closeout member is received in one of the slots, and a second position wherein the closeout members are spaced apart from the slots; and
an electromagnet operable in an activated state wherein the electromagnet magnetically couples the closeout panel to one of the distal floor panel or the proximal floor panel for common movement therewith.

17. The vehicle floor assembly of claim 16, further comprising a permanent magnet, the permanent magnet being configured to magnetically couple the closeout panel to the other one of the distal floor panel or the proximal floor panel for common movement therewith when the electromagnet is in a deactivated state.

18. The vehicle floor assembly of claim 17, wherein the electromagnet is fixedly coupled to the distal floor panel and the permanent magnet is fixedly coupled to the proximal floor panel.

19. The vehicle floor assembly of claim 16, further comprising:
   a seat position sensor configured to detect a position of a seat relative to the floor frame;
   a floor position sensor configured to detect a position of the distal floor panel or the proximal floor panel relative to the floor frame; and
   a control module in communication with the seat position sensor and the floor position sensor, the control module being configured to activate the electromagnet when the seat position sensor detects the seat in a first predetermined position and the floor position sensor detects the distal floor panel or the proximal floor panel in a second predetermined position.

20. The vehicle floor assembly of claim 19, wherein the first predetermined position includes the seat being positioned in the stowage cavity and the second predetermined position includes the distal or proximal floor panel being spaced apart from the floor frame.

* * * * *